(12) United States Patent
Hasegawa et al.

(10) Patent No.: US 8,773,874 B2
(45) Date of Patent: Jul. 8, 2014

(54) POWER SUPPLY SYSTEM AND PLURALITY PARALLEL RESONANT CONVERTERS HAVING CURRENT BLOCKING CIRCUIT

(75) Inventors: Takahiko Hasegawa, Toyota (JP); Toshihiko Minamii, Nisshin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 216 days.

(21) Appl. No.: 13/375,699

(22) PCT Filed: Jun. 2, 2009

(86) PCT No.: PCT/JP2009/060071
§ 371 (c)(1),
(2), (4) Date: Dec. 1, 2011

(87) PCT Pub. No.: WO2010/140217
PCT Pub. Date: Dec. 9, 2010

(65) Prior Publication Data
US 2012/0074919 A1    Mar. 29, 2012

(51) Int. Cl.
*H02J 1/10* (2006.01)
*H02M 7/48* (2006.01)

(52) U.S. Cl.
USPC .............................................. 363/65; 363/71

(58) Field of Classification Search
USPC ................. 363/65, 66, 67, 68, 69, 70, 71, 72; 323/222, 225
See application file for complete search history.

(56) References Cited

U.S. PATENT DOCUMENTS

| | | | |
|---|---|---|---|
| 5,862,043 A * | 1/1999 | Youn et al. | 363/21.04 |
| 5,946,206 A * | 8/1999 | Shimizu et al. | 363/65 |
| 6,018,469 A | 1/2000 | Poon | |
| 6,777,909 B1 | 8/2004 | Aberle et al. | |
| 7,274,116 B2 * | 9/2007 | Inoue et al. | 307/100 |
| 7,768,228 B2 * | 8/2010 | Kajouke et al. | 318/811 |
| 2006/0291260 A1 * | 12/2006 | Nakashima | 363/65 |
| 2008/0094866 A1 | 4/2008 | Bauman et al. | |
| 2009/0066271 A1 | 3/2009 | Kajouke et al. | |

FOREIGN PATENT DOCUMENTS

| | | |
|---|---|---|
| DE | 19954306 A1 | 7/2001 |
| DE | 69832220 T2 | 7/2006 |
| DE | 102008046301 A1 | 4/2009 |
| JP | 09-261861 A | 10/1997 |
| JP | H10-094249 A | 4/1998 |
| JP | 2003-249236 A | 9/2003 |
| JP | 2004-088578 A | 3/2004 |
| JP | 2005-253261 A | 9/2005 |
| JP | 2006-033934 A | 2/2006 |
| JP | 2006-340476 A | 12/2006 |
| WO | 2006/098376 A1 | 9/2006 |

OTHER PUBLICATIONS

International Search Report mailed Sep. 1, 2009 of PCT/JP2009/060071.

* cited by examiner

*Primary Examiner* — Adolf Berhane
*Assistant Examiner* — Emily P Pham
(74) *Attorney, Agent, or Firm* — Kenyon & Kenyon LLP

(57) ABSTRACT

Between a direct-current power source and a connection point where a resonance current flowing in an opposite direction from a main current joins the main current from the direct-current power source in a resonant converter, there is provided a current blocking circuit which blocks the resonance current toward the direct-current power source. In consequence, it is possible to prevent the reverse charging of the direct-current power source with the resonance current which realizes soft switching in the resonant converter.

9 Claims, 15 Drawing Sheets

POWER SUPPLY SYSTEM AND PLURALITY PARALLEL RESONANT CONVERTERS HAVING CURRENT BLOCKING CIRCUIT

This is a 371 national phase application of PCT/JP2009/060071 filed 2 Jun. 2009, the contents of which are incorporated herein by reference.

TECHNICAL FIELD

The present invention relates to a power supply system, and more particularly, it relates to a power supply system including a resonant converter.

BACKGROUND ART

As a voltage converter, a DC-DC converter which raises and/or lowers a direct-current (DC) voltage has been known. The DC-DC converter has broadly been used in electric devices such as a personal computer, an AV apparatus, a cellular phone and a power supply system each including an electric circuit. In recent years, the DC-DC converter has been used in, for example, power supply systems of vehicles such as a fuel cell car, an electric car and a hybrid car.

The DC-DC converter can be constituted by combining, for example, a switching element such as a transistor, a coil (a reactor), a capacitor, a diode and the like. Examples of the DC-DC converter include a DC-DC converter called a resonant converter which realizes soft switching of the switching element. The soft switching enables a switching operation in a state where a voltage and/or a current is zeroed, by use of a current resonance phenomenon or the like, to decrease power losses at the switching.

PRIOR ART DOCUMENTS

Patent Document(s)

Patent Document 1: JP2006-340476 A

SUMMARY OF THE INVENTION

Problems to be Solved by the Invention

In a resonant converter, a resonance current which realizes soft switching may be regenerated (flows backward) on an input side. When a regenerating destination of the resonance current is a direct-current power source such as a fuel cell, the direct-current power source is reversely charged with the resonance current, whereby the deterioration of a performance might occur.

Therefore, an object of the present invention is to prevent the reverse charging of a direct-current power source with a resonance current which realizes soft switching in a resonant converter, whereby it is possible to prevent the deterioration of a performance of the power source.

It is to be noted that the present invention is not limited to the above object, and it is possible to position, as another object of the present invention, the producing of a function/effect which is derived from each constitution described later in a description of embodiments and which cannot be achieved by the prior art.

Means for Solving the Problem

An aspect of a power supply system of the present invention is a power supply system comprising a direct-current power source, and a resonant converter which converts a direct-current voltage input from the direct-current power source into a predetermined output voltage by soft switching based on a current resonance phenomenon, wherein the resonant converter has a connection point where a resonance current generated by the resonance phenomenon and flowing in an opposite direction from a main current joins the main current from the direct-current power source, and between the direct-current power source and the connection point, a current blocking circuit which blocks the resonance current toward the direct-current power source is provided.

Here, the current blocking circuit may be a diode in which an anode is connected to an electricity path on the side of the direct-current power source and a cathode is connected to the electricity path on the side of the connection point, or a reactor.

Moreover, the power supply system further comprises a bypass switch provided in the electricity path which bypasses the current blocking circuit, and the bypass switch may be ON-controlled in a case where a current amount of the main current is not less than a predetermined value.

Furthermore, in a case where the plurality of resonant converters are connected in parallel, the current blocking circuit may be provided in a predetermined resonant converter in which a single driving period is specified when the number of the resonant converters to be driven is controlled to increase or decrease in accordance with the output voltage.

Additionally, phases of the resonance currents in the respective resonant converters may be controlled to become different from one another among the different resonant converters.

Effect of the Invention

According to the present invention, it is possible to prevent the reverse charging of a direct-current power source with a resonance current which realizes soft switching in a resonant converter. Therefore, it is possible to prevent the deterioration of a performance of the direct-current power source.

DESCRIPTION OF EMBODIMENTS

Hereinafter, embodiments of the present invention will be described with reference to the drawings with the proviso that the embodiments described hereinafter are merely illustrations and do not intend to exclude the applications of various modifications or technologies which will not clearly be described hereinafter. That is, the present invention can be carried out by variously modifying the invention without departing from the scope of the invention (combining the embodiments, etc.). Moreover, in the following description of the drawings, the same or similar parts are denoted with the same or similar symbols. The drawings are schematically illustrated, and do not necessarily match actual dimensions, ratios and the like. Among the drawings, mutual dimensional relations or portions having different ratios may be included.

[1] Description of One Embodiment

Figure 1:
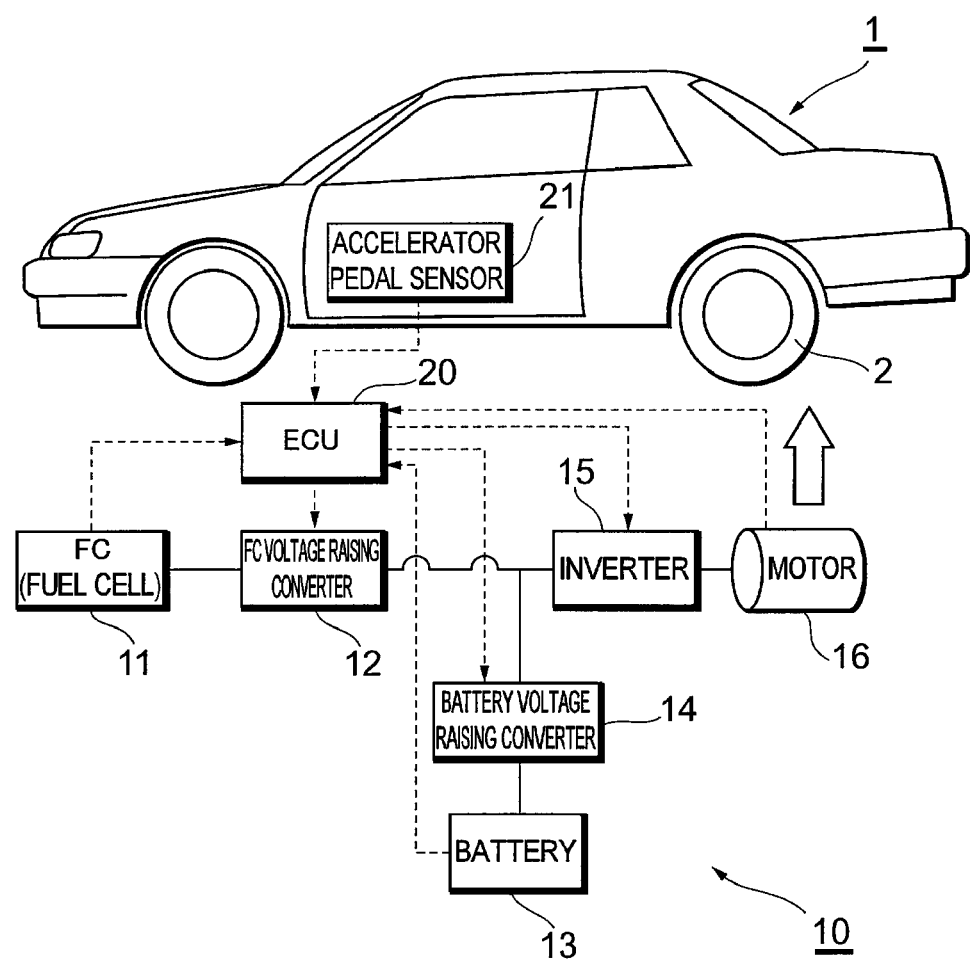
FIG. 1 is a view schematically illustrating a constitution example of a power supply system according to an embodiment and a vehicle 1 on which the power supply system is installed.

FIG. 1 is a view schematically illustrating a constitution example of a power supply system 10 according to the embodiment and a vehicle 1 on which the power supply system 10 is installed.

The power supply system 10 is illustratively a fuel cell system including a fuel cell (FC) 11, and the vehicle 1 is a fuel cell car as an example of an electric device including the fuel cell system 10 as a supply source of a driving power. However, the vehicle 1 may be an electric car or a hybrid car.

The vehicle 1 includes a motor 16 which drives driving wheels 2, an electronic control unit (ECU) 20, an accelerator pedal sensor 21 which detects an open degree of an accelerator pedal, and the like. The accelerator pedal sensor 21 is electrically connected to the electronic control unit 20, and a rotation speed of the motor 16 (the driving wheels 2) is controlled by the ECU 20 in accordance with, for example, the detected open degree of the accelerator pedal.

The fuel cell system 10 includes, in addition to the fuel cell (FC) 11, an FC voltage raising converter 12, a battery 13, a battery voltage raising converter 14, an inverter 15 and the like as a non-limiting example.

The FC 11 is a device which generates a power by use of an electrochemical reaction. To the FC 11, it is possible to apply various types of fuel cells such as a solid polymer type, a phosphate type, a molten carbonate type, a solid oxide type and an alkali electrolyte type. The power generated by the FC 11 is used as the driving power of the motor 16 which drives the driving wheels 2 of the vehicle 1 or used in charging the battery 13.

The battery 13 is a chargeable/dischargeable secondary battery, and it is possible to apply secondary batteries of various types such as lithium ion, nickel hydrogen and nickel cadmium. The battery 13 can supply the power to various electric apparatuses for use during the run of the vehicle 1 or the FC 11. Examples of the electric device mentioned herein include an illumination device of the vehicle 1, an air conditioning device, a hydraulic pump, a pump which supplies a fuel gas or a reforming raw material of the FC 11, and a heater which regulates a temperature of a reformer.

The FC 11 and the battery 13 are electrically connected in parallel with the inverter 15 as depicted in FIG. 1. An electricity path leading from the FC 11 to the inverter 15 is provided with the FC voltage raising converter 12. The FC voltage raising converter 12 is a DC-DC converter which raises an input DC voltage, and converts (e.g. raises) the DC voltage generated by the FC 11 into a predetermined DC voltage in a convertible range, whereby the voltage can be applied to the inverter 15. Through such a voltage raising operation, it is possible to acquire the driving power required for driving the motor 16, even when an output power of the FC 11 is low.

On the other hand, in the electricity path leading from the battery 13 to the inverter 15, the battery voltage raising converter 14 is connected in parallel with the electricity path between the FC voltage raising converter 12 and the inverter 15. The converter 14 is also a DC-DC converter, and can convert the DC voltage applied from the battery 13 or the inverter 15 into a predetermined DC voltage in a convertible range.

To the converter 14, it is possible to apply a voltage raising/lowering type converter which can perform both the raising and the lowering of the voltage, and the converter controls, for example, the input DC voltage (raises the voltage) from the battery 13 to output the voltage to a inverter 15 side, whereas the converter controls the input DC voltage from the FC 11 or the motor 16 (lowers the voltage) and can output the voltage to the battery 13. This enables the charging/discharging of the battery 13.

Moreover, when the output voltage of the converter 14 is controlled, a terminal voltage of the inverter 15 can be controlled. In the control, a relative output voltage difference between the power sources (the FC 11 and the battery 13) connected in parallel with the inverter 15 is controlled, which enables the appropriately separate using of the powers of both the sources.

The inverter 15 receives the input of the DC voltage from the FC 11 through the converter 12 or from the battery 13 through the converter 14, and converts the input DC voltage into an alternating-current (AC) voltage to supply this voltage as the driving voltage of the motor 16. In this case, the ECU 20 controls the operation (switching) of the inverter 15 so that the AC voltage corresponding to a requested power is supplied to the motor 16.

The ECU 20 integrally controls the operation (run) of the vehicle 1 and the fuel cell system 10, in addition to the above-mentioned control. The ECU 20 can illustratively be realized as a microcomputer including a CPU as an example of a calculation processing device, an RAM or an ROM as an example of a memory, and the like. The ECU 20 is electrically connected to elements such as the motor 16 and the fuel cell system 10, and a group of various sensors, and appropriately performs the receiving of various sensor values, calculation processing, the transmitting of commands (control signals), and the like. The sensor group can illustratively include, in addition to the accelerator pedal sensor 21, an SOC sensor which detects a state of charge (SOC) of the battery 13, a vehicle speed sensor which detects a car speed (the rotation number of the motor 16), and the like.

[2] Voltage Raising Converter 12

Figure 2:
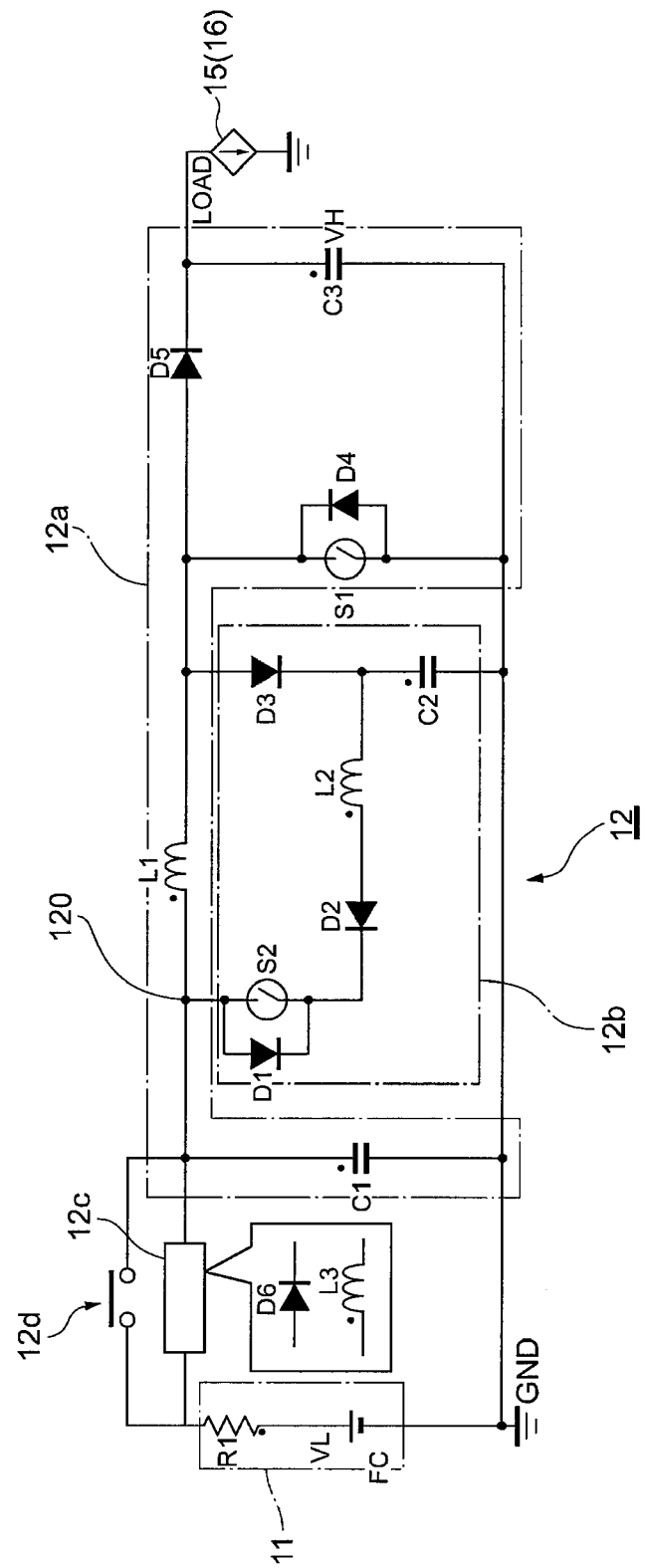
FIG. 2 is a circuit diagram illustrating an example of an FC voltage raising converter depicted in FIG. 1.

Next, an example of an electric circuit diagram of the voltage raising converter 12 is illustrated in FIG. 2. The voltage raising converter 12 depicted in FIG. 2 illustratively includes a main circuit 12a, an auxiliary circuit 12b, a regenerative current blocking circuit 12c and a bypass circuit 12d.

The regenerative current blocking circuit 12c is a circuit in which one end is connected to a high potential side of the FC 11 and the other end is connected in series with a reactor L1 which is an element of the main circuit 12a, to block a regenerative current which flows backward (is regenerated) toward the high potential side of the FC 11. In the regenerative current blocking circuit 12c, illustratively, a diode D6 or a reactor L3 may be used. When the diode D6 is used, an anode is connected to an electricity path on the high potential side of the FC 11, and a cathode is connected to the electricity path on a reactor L1 side.

One end of the bypass circuit 12d is illustratively connected to the high potential side of the FC 11, and the other end thereof is connected to a connection point of the input capacitor C1 connected to the electricity path between the regenerative current blocking circuit 12c and the reactor L1. The bypass circuit 12d can be ON/OFF-controlled by, for example, the ECU 20, and when the bypass circuit is ON-controlled, the bypass circuit can bypass the electricity path via the regenerative current blocking circuit 12c. In the bypass circuit 12d, a relay switch may illustratively be used.

The other end of the input capacitor C1 is connected to a low potential side [e.g. a ground (GND)] of the FC 11. The input capacitor C1 smoothes the voltages at both ends thereof (the voltages before raised) to decrease ripples. When the bypass circuit 12d is turned on, the voltages at both the ends of the capacitor C1 which are the voltages before raised are equivalent to the output voltage of the FC 11.

The main circuit 12a includes, for example, a switch circuit including a main switch S1 and an antiparallel diode D4; the reactor (coil) L1; an output diode D5; the input capacitor C1; and an output capacitor C3. The main circuit 12a periodically repeats the accumulation of electric energy of the reactor L1 and the release of the accumulated energy in accordance with an amount of the current (the main current) flowing through the reactor L1, by periodically controlling the switching (ON/OFF) of the main switch S1. The released electric energy is superimposed onto the output voltage of the FC 11, to output the energy to a motor 16 side (the inverter 15 side) which is an example of a load via the diode D5. In consequence, an input voltage (the output voltage of the FC 11) VL is raised to a predetermined output voltage VH.

Illustratively, one end of the reactor L1 is electrically connected to a positive electrode of the FC 11 through the regenerative current blocking circuit 12c, and the other end of the reactor L1 is connected in series with an anode of the diode D5. One end of the output capacitor C3 is connected in parallel with a cathode of the diode D5. A cathode voltage of the output diode D5 is a raised voltage to be supplied to the motor 16 side (the inverter 15 side) which is the example of the load. The output capacitor C3 smoothes the raised voltage to decrease fluctuations.

To the main switch S1, it is possible to apply an insulating gate bipolar transistor (IGBT) as a non-limiting example, one pole (e.g. a collector) is connected in parallel with the electricity path between the reactor L1 and the output diode D5, and the other pole (e.g. an emitter) is connected to a negative electrode side (GND) of the FC 11.

When a switch control signal such as a pulse width modulation (PWM) signal is given to, for example, a gate of the main switch S1, the ON/OFF state of the main switch S1 is controlled. Moreover, when a duty ratio of the switch control signal is controlled, an average amount of the current flowing through the reactor L1 toward the output diode D5 is controlled, whereby it is possible to control a voltage raising degree of the voltage raising converter 12. The switch control signal is generated in, for example, the ECU 20.

The antiparallel diode D4 is connected between both the poles of the main switch S1. The antiparallel diode D4 allows the passing of the current in an opposite direction from a current passing direction when the main switch S1 is turned on.

The auxiliary circuit 12b illustratively includes a (regenerative) diode D3; a reactor (coil) L2; a (snubber reverse current preventing) diode D2; a switch circuit including an auxiliary switch S2 and an antiparallel diode D1; and a (resonant) capacitor C2. When the auxiliary switch S2 is turned on, an LC resonance phenomenon by the reactor L2 and the capacitor C2 occurs, and the soft switching of the main switch S1 and the auxiliary switch S2 can be realized by use of the LC resonance phenomenon.

Illustratively, an anode of the diode D3 is connected to the electricity path between the reactor L1 and the output diode D5, whereby the diode is connected in parallel with the main switch S1. A cathode of the diode D3 is connected to one end of the capacitor C2, and the other end of the capacitor C2 is connected to the negative electrode side (GND) of the FC 11. Moreover, one end of the reactor L2 is connected in parallel with a connection point between the cathode of the diode D3 and the capacitor C2, and the other end of the reactor L2 is connected to an anode of the diode D2.

Furthermore, a cathode of the diode D2 is connected to one (e.g. a collector) of both poles of the auxiliary switch S2, and the other pole (e.g. an emitter) of the auxiliary switch S2 is connected to one end of the reactor L1 on the FC 11 side. Between both the poles of the auxiliary switch S2, the diode D1 is connected in parallel. It is to be noted that the connecting position of the reactor L2 and the connecting position of the switch circuit including the auxiliary switch S2 and the diode D1 may be replaced with each other.

The regenerative current blocking circuit 12c blocks part of the resonance current by the reactor L2 and the capacitor C2 (hereinafter referred to also as "the L2C2 resonance current"), which cannot be absorbed by the capacitor C1 and is regenerated on the FC 11 side, when the main switch S1 is turned off and the auxiliary switch S2 is turned on. In the regenerative current blocking circuit 12c, for example, the diode D6 or the reactor L3 may be used.

The bypass circuit (the bypass switch) 12d is illustratively provided in the electricity path between the high potential side of the FC 11 and the connection point of the input capacitor C1 with the reactor L1, and communicates between the high potential side of the FC 11 and the reactor L1 to bypass the regenerative current blocking circuit 12c on conditions (described later) that it can be judged that any L2C2 resonance current is not regenerated on the FC 11 side. In consequence, circuit losses due to the regenerative current blocking circuit 12c can be decreased. To the bypass circuit 12d, for example, a relay switch may be applied, and ON/OFF control thereof may be performed by, for example, the ECU 20.

[3] Soft Switching Operation (Modes 1 through 6)

In the voltage raising converter 12 constituted as described above, one cycle of a voltage raising operation based on a soft switching operation can illustratively be represented by the following state transition (modes 1 through 6). It is to be noted that in FIG. 3 and FIG. 5 for use in the following description, the regenerative current blocking circuit 12c and the bypass circuit 12d are omitted.

Figure 3:
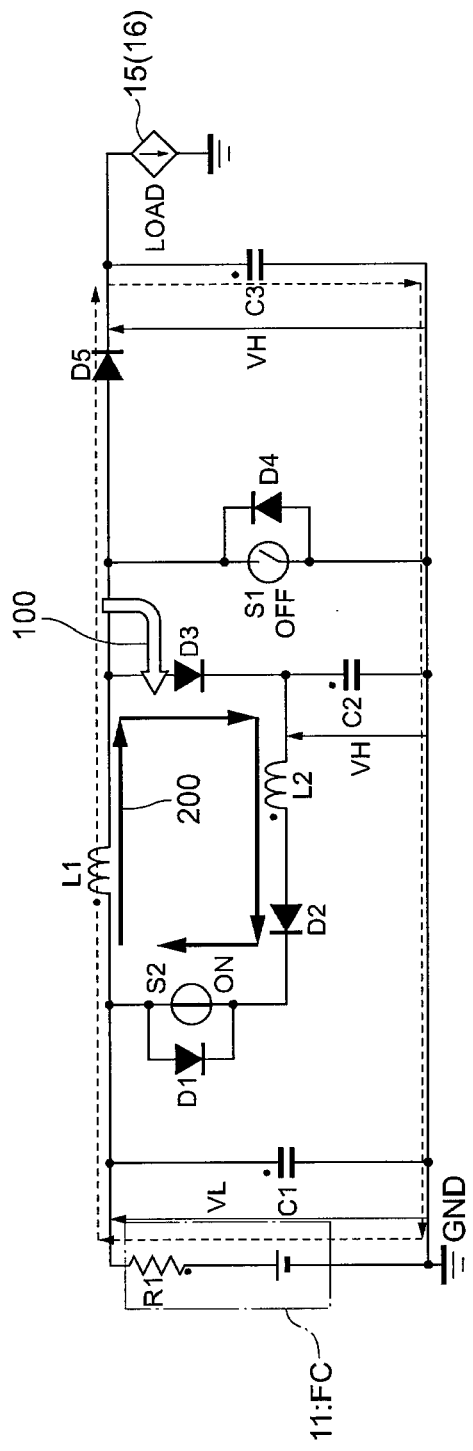
FIG. 3 is a diagram which explains an operation (a mode 1) of the FC voltage raising converter depicted in FIG. 2.

In an initial state where both the main switch S1 and the auxiliary switch S2 are turned off, the current passes through a path depicted by dotted lines in FIG. 3, and the power is supplied to the inverter 15 (the motor 16) side.

(Mode 1)

Figure 4:
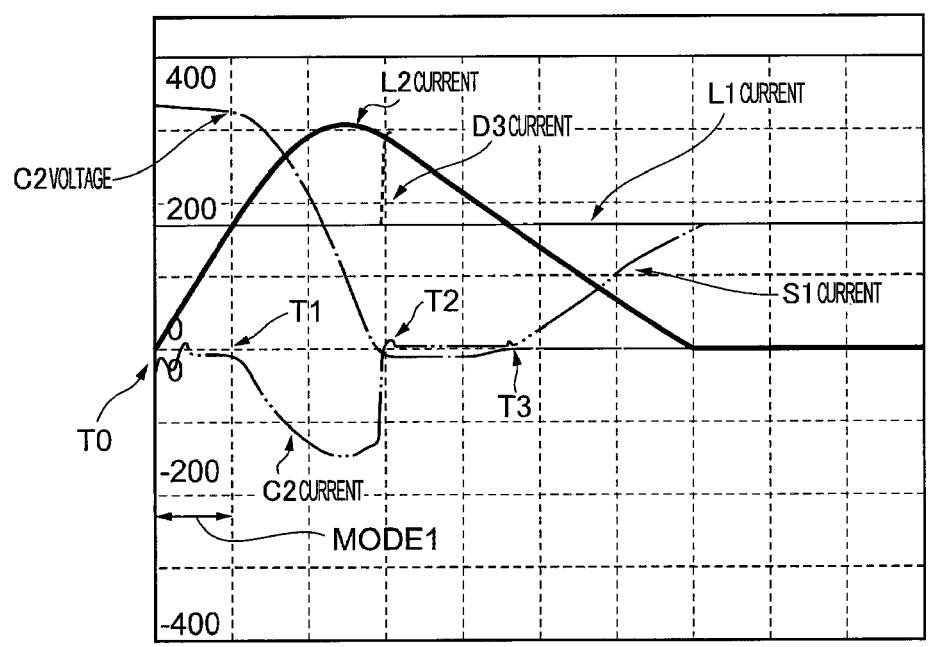
FIG. 4 is a graph illustrating an example of a change, with time, of a current or a voltage of an element in the FC voltage raising converter in the mode 1.

When the main switch S1 remains to be off and the auxiliary switch S2 is turned on from the initial state, a charge accumulated in the output diode D5 flows through the diode D3, the reactor L2 and the auxiliary switch S2 to the input capacitor C1, and is extinguished (soft turn-off). On the other hand, the current flowing from the FC 11 side through the reactor L1 and the output diode D5 gradually shifts to the auxiliary circuit 12b side (the diode D3). An arrow 100 in FIG. 3 illustrates the behavior. Therefore, the current returns through the auxiliary circuit 12b via a path of the reactor L1, the diode D3, the reactor L2, the diode D2 and the auxiliary switch S2 as depicted by a solid line 200 in FIG. 3. Consequently, as depicted in FIG. 4, the current (the L2 current) flowing through the reactor L2 and the auxiliary switch S2 increases in accordance with a both-end voltage (VH-VL) of the reactor L2 and an inductance value of the reactor L2, for a period of the mode 1 (a period of time T0 to T1).

(Mode 2)

Figure 5:
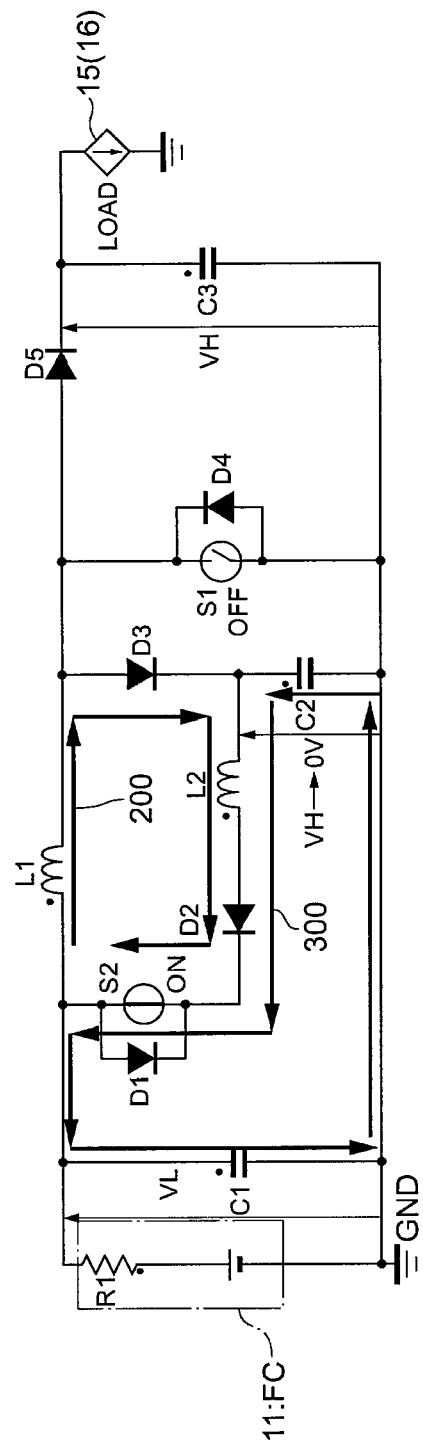
FIG. 5 is a diagram which explains an operation (a mode 2) of the FC voltage raising converter depicted in FIG. 2.
Figure 6:
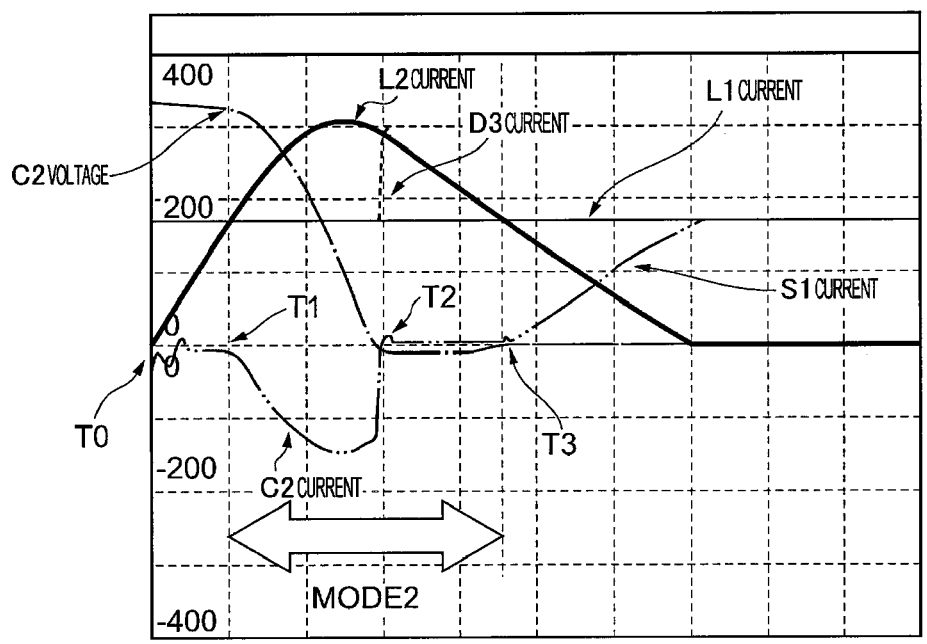
FIG. 6 is a graph illustrating an example of the change, with time, of the current or the voltage of the element in the FC voltage raising converter in the mode 2.

Afterward, as depicted by, for example, a solid line 300 in FIG. 5, the charge accumulated in the capacitor C2 is gradually discharged to the reactor L2 side, and the current passes through a path of the reactor L2, the auxiliary switch S2 and the input capacitor C1. In consequence, the LC resonance phenomenon by the reactor L2 and the capacitor C2 occurs, and the both-end voltage of the capacitor C2 gradually decreases from a positive value to zero in the form of a sine wave (see time T1 to T2 of FIG. 6). At a moment when the auxiliary switch S2 turns on (at the time T1 of FIG. 6), the auxiliary switch S2 has a zero current, and is therefore turned on by the soft switching.

(Mode 3)

All the charges of the capacitor C2 are discharged, the voltage of the capacitor C2 becomes zero (see the time T2 of FIG. 6), and at a timing (see time T3 of FIG. 6) when the currents flowing through the reactor L1 and the reactor L2 (an L1 current and an L2 current) mutually become the same, the main switch S1 is turned on. Then, the current returning through the auxiliary circuit 12b starts passing through the main switch S1, and the current flowing through the main switch S1 (an S1 current; see FIG. 6) gradually increases.

(Mode 4)

At this time, the main switch S1 turns on from a zero current and a zero voltage. When the main switch S1 is turned on, the current passes through a path of the main switch S1, the FC 11 and the reactor L1, and the electric energy is gradually accumulated in the reactor L1. At this time, any current does not flow through the auxiliary circuit 12b, and hence the capacitor C2 is not charged, whereby the voltage of the capacitor C2 remains to be the zero voltage (see FIG. 6).

(Mode 5)

Afterward, both the main switch S1 and the auxiliary switch S2 are turned off. Both the switches S1 and S2 may simultaneously be turned off, or the auxiliary switch S2 may first be turned off. At this time, since the voltage of the capacitor C2 is zero, the auxiliary switch S2 is turned off from the zero current and the zero voltage, and the main switch S1 is turned off from the zero voltage. When the main switch S1 is turned off, the current flowing through the reactor L1 starts flowing through a path of the diode D3, the capacitor C2, the FC 11 and the reactor L1, to start charging the capacitor C2. The capacitor C2 is charged to suppress a voltage raising speed when the main switch S1 is turned off, which can decrease losses in a region where a tail current is present.

Mode 6)

When the capacitor C2 is charged until the voltage becomes the same as the output voltage VH, the output diode D5 turns on, and the electric energy accumulated in the reactor L1 up to this time is supplied to the inverter 15 (the motor 16) side. Afterward, the auxiliary switch S2 turns on again, and the next cycle starts from the mode 1.

[4] Blocking of Regenerative Current to FC 11

Figure 7:
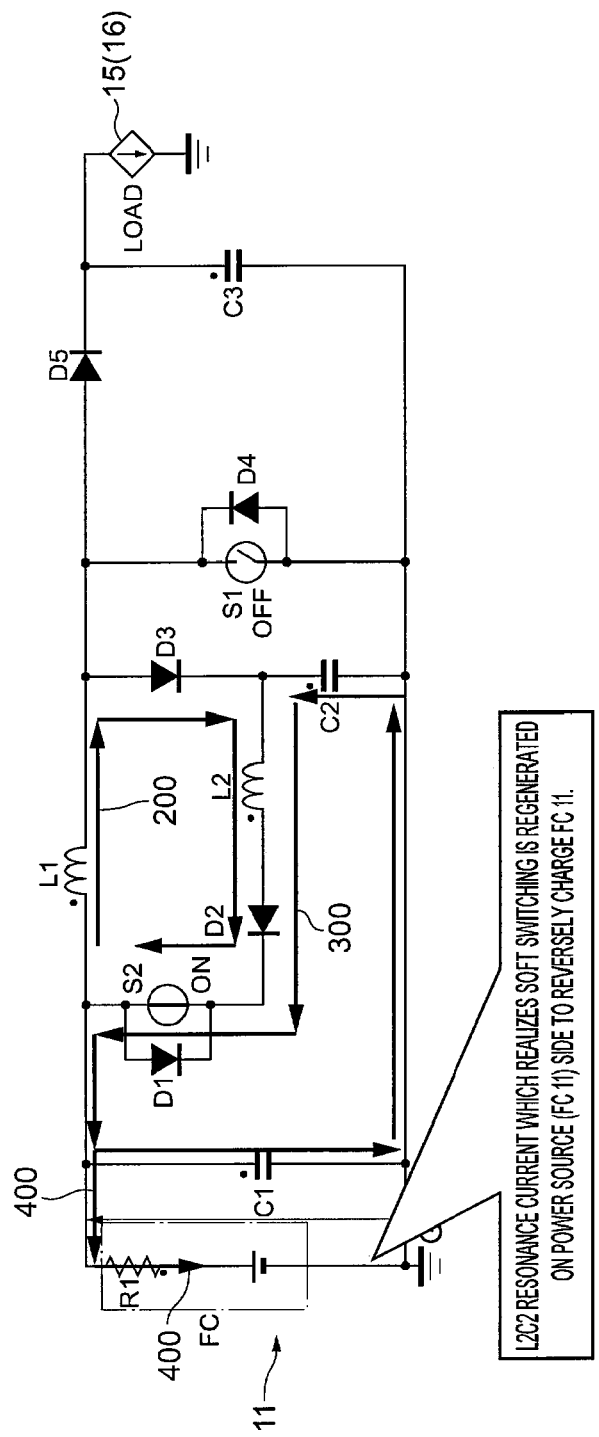
FIG. 7 is a diagram which illustrates a behavior that a resonance current is regenerated on a power source side in the FC voltage raising converter depicted in FIG. 2.

In the mode 2 of the above soft switching operation, the charge discharged form the capacitor C2 flows, as the L2C2 resonance current, through the path 300 of the reactor L2, the diode D2, the auxiliary switch S2 and the capacitor C1. At this time, the L2C2 resonance current joins the main current (the L1 current) flowing from the FC 11 through the main circuit 12a, at a connection point 120 of the reactor L1 of the main circuit 12a with the auxiliary switch S2 of the auxiliary circuit 12b, and the current flows in an opposite direction from the L1 current. The L2C2 resonance current flows into the capacitor C1 and is absorbed. However, the L2C2 resonance current which cannot completely be absorbed by the capacitor C1 is to flow backward (be regenerated) on the FC 11 side (see an arrow 400 of FIG. 7). In other words, when the capacitor C1 is not present, all the L2C2 resonance current is to be regenerated on the FC 11 side.

However, in the present example, since the electricity path between (the high potential side of) the FC 11 and the connection point 120 is provided with the regenerative current blocking circuit 12c (e.g. the diode D6 or the reactor L3), it is possible to prevent the flowing of the regenerative current into the FC 11, i.e., the reverse charging of the FC 11, when the bypass circuit (the relay switch) 12d is turned off (a non-bypass state). Therefore, it is possible to prevent the deterioration of a performance of the FC 11. In other words, the bypass circuit 12d may be turned on in a period when any current toward the FC 11 is not generated. In the state where the bypass circuit 12d is turned on, it is possible to decrease the circuit losses due to the providing of the regenerative current blocking circuit 12c.

(Control Logic of Bypass Circuit 12D)

Hereinafter, a control logic (control conditions) of the ON/OFF control of the bypass circuit 12d will be described in detail.

First, an amount of the regenerative current to the FC 11 side is obtained. Here, the amount of the regenerative current is equivalent to an amount of the L2C2 resonance current generated by discharging the charge of the capacitor C2, and hence the amount of the L2C2 resonance current may be obtained. When a capacity of the capacitor C2 is $C_2$, the inductance value of the reactor L2 is $L_2$, a voltage to be applied to the capacitor C2 is V and a current flowing through the reactor L2 (the L2 current) is I, respectively, the following equation (1) is established according to a law of conservation of energy.

[Equation 1]

$$\tfrac{1}{2}C_2 V^2 = \tfrac{1}{2} L_2 I^2 \quad (1)$$

Therefore, the L2 current I can be obtained by the following equation (2).

[Equation 2]

$$I = \sqrt{\frac{C_2 V^2}{L_2}} \quad (2)$$

Here, when the voltage of the capacitor C2 is V=VH−VL, the equation (2) becomes the following equation (3).

[Equation 3]

$$I = \sqrt{\frac{C_2 \times (VH - VL)^2}{L_2}} \quad (3)$$

Therefore, the L2C2 resonance current I represented by the equation (3) is branched to the FC 11 side and the capacitor C1 side at the connection point of the input capacitor C1 in accordance with impedances of the FC 11 and the capacitor C1.

Figure 8:
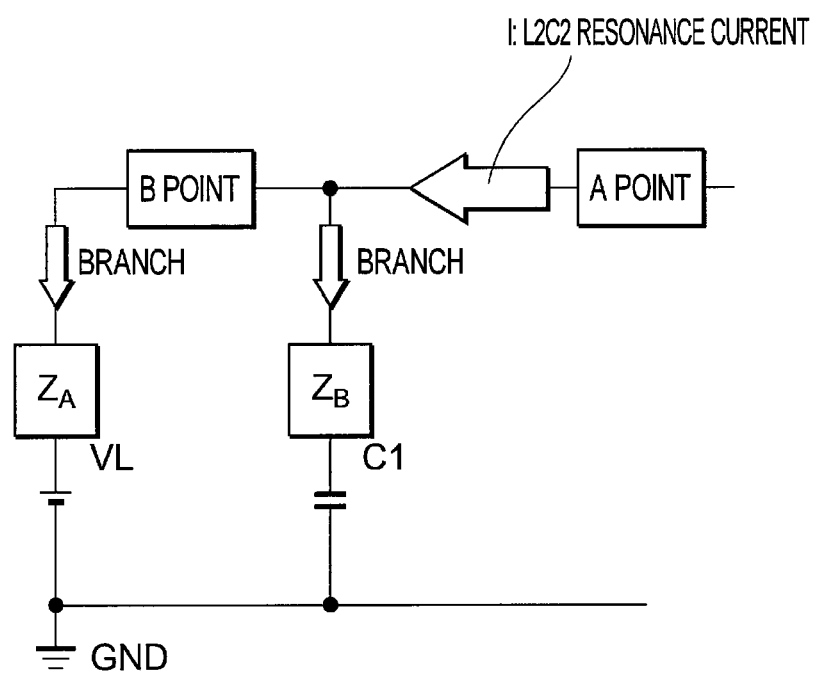
FIG. 8 is a partial equivalent circuit diagram of the FC voltage raising converter depicted in FIG. 2.

Here, when impedance values of paths seen from the high potential side of the FC 11 and the capacitor C1 are $Z_A$ and $Z_B$, respectively, as depicted in, for example, FIG. 8, any current does not flow to the FC 11 side (a B point), in a case where a predetermined amount of the current or more (the L1 current) flows in a forward direction (a direction toward the output diode D5) to an A point corresponding to the position of the reactor L1. Therefore, in this case, any reverse current does not flow to the FC 11 side, even when the bypass circuit 12*d* is turned on.

An (average) amount of the current at the A point (the amount of the L1 current) changes in accordance with an output power (a voltage raising ratio) required for the voltage raising converter 12, and hence the amount changes in accordance with, for example, a height of a driving (running) load of the motor 16.

Figure 9:
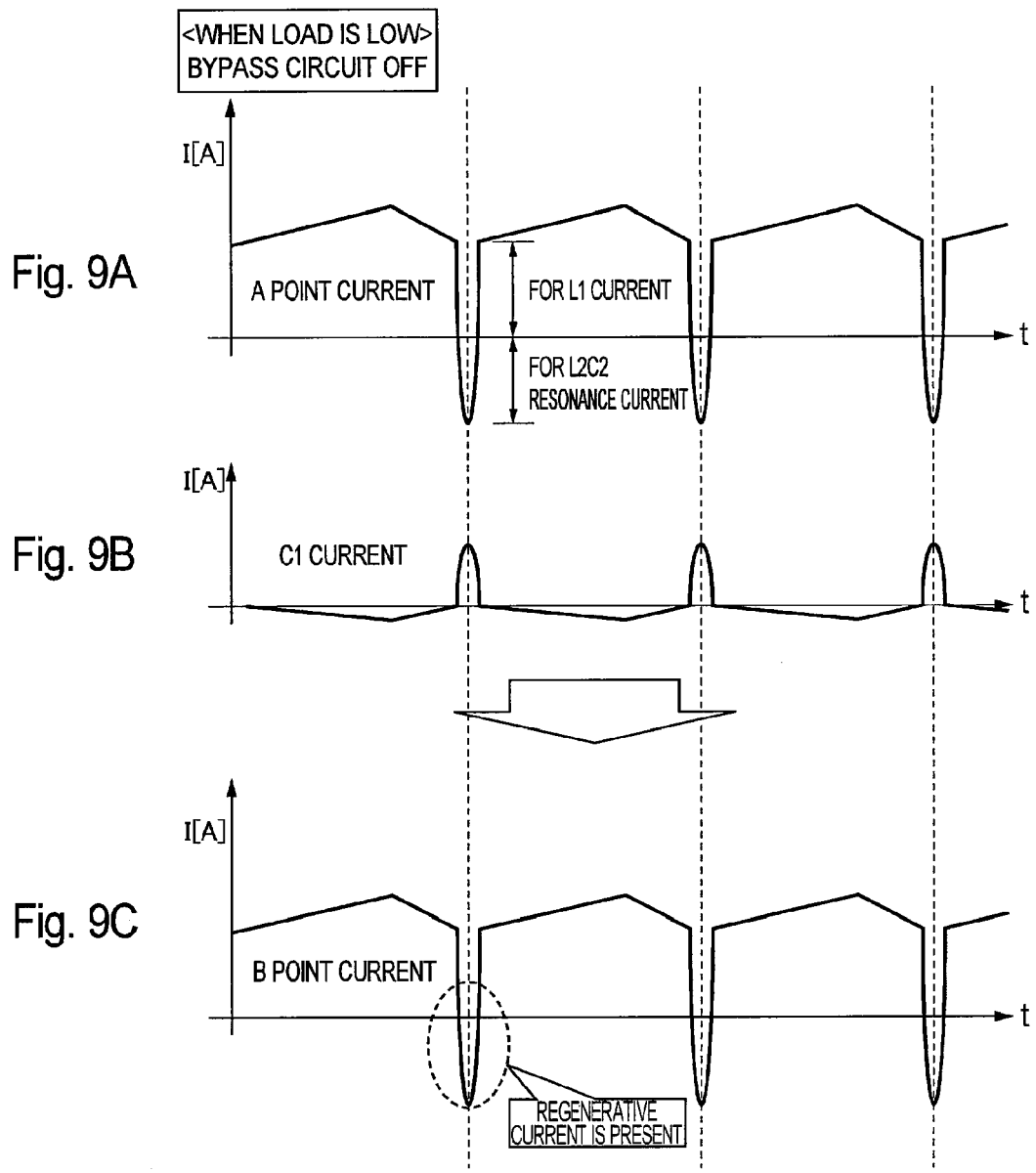
FIGS. 9(A) through (C) are diagrams illustrating an example of changes, with time, of currents flowing through a point A, a capacitor C1 and a point B, respectively, at a low load time in FIG. 8.
Figure 10:
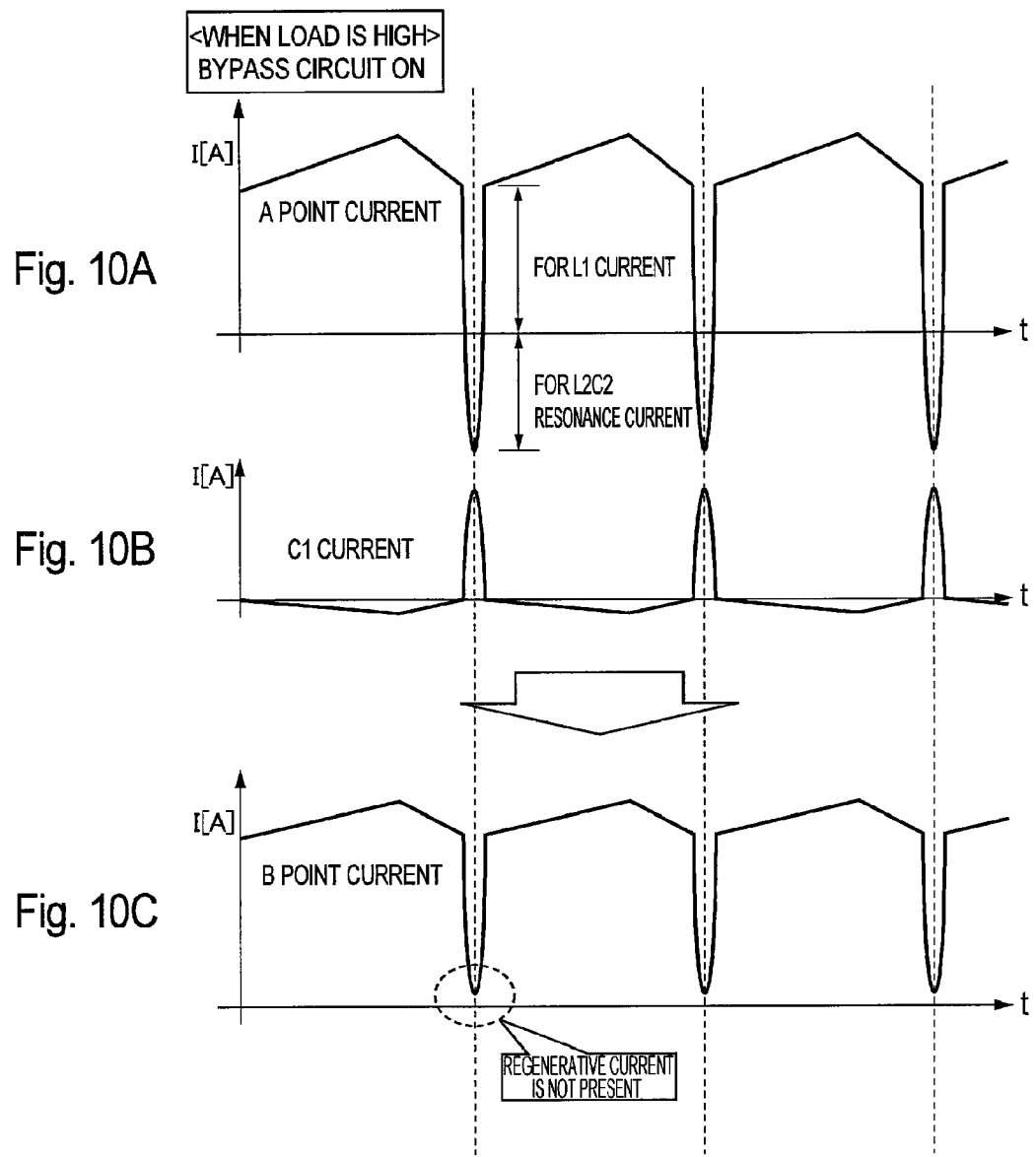
FIGS. 10(A) through (C) are diagrams illustrating an example of changes, with time, of currents flowing through the point A, the capacitor C1 and the point B, respectively, at a high load time in FIG. 8.

FIG. 9 illustrates one example of changes, with time, of the currents flowing through the A point, the capacitor C1 and the B point, respectively, at a low load time, and FIG. 10 illustrates one example of changes, with time, of the currents flowing through the A point, the capacitor C1 and the B point, respectively, at a high load time. It is to be noted that in each of FIG. 9 and FIG. 10, (A) illustrates the example of the change of the current amount at the A point with time, (B) illustrates the example of the change of the amount of the current flowing through the capacitor C1 with time, and (C) illustrates the example of the change of the amount of the current flowing through the B point with time.

It is seen from comparison of FIG. 9 with FIG. 10 that the amount of the L2C2 resonance current branched to the capacitor C1 side becomes larger at the high load time when the amount of the L1 current becomes relatively large, and eventually the amount of the current branched to the B point decreases. Therefore, it is considered that the amount of the L1 current with which any current does not flow through the B point is present and the amount of the L1 current is a threshold value (hereinafter referred to as "the bypass ON threshold value"), to control the ON/OFF state of the bypass circuit 12*d*, and in this case, the circuit losses due to the regenerative current blocking circuit 12*c* can efficiently be decreased.

Here, the voltage raising ratio in accordance with a high load/low load run can be controlled by controlling, for example, a ratio (the duty ratio) of an ON/OFF period in one switching period of the main switch S1. When the control is performed by the ECU 20, the ECU 20 grasps the average current amount at the A point (the L1 current amount).

Figure 11:
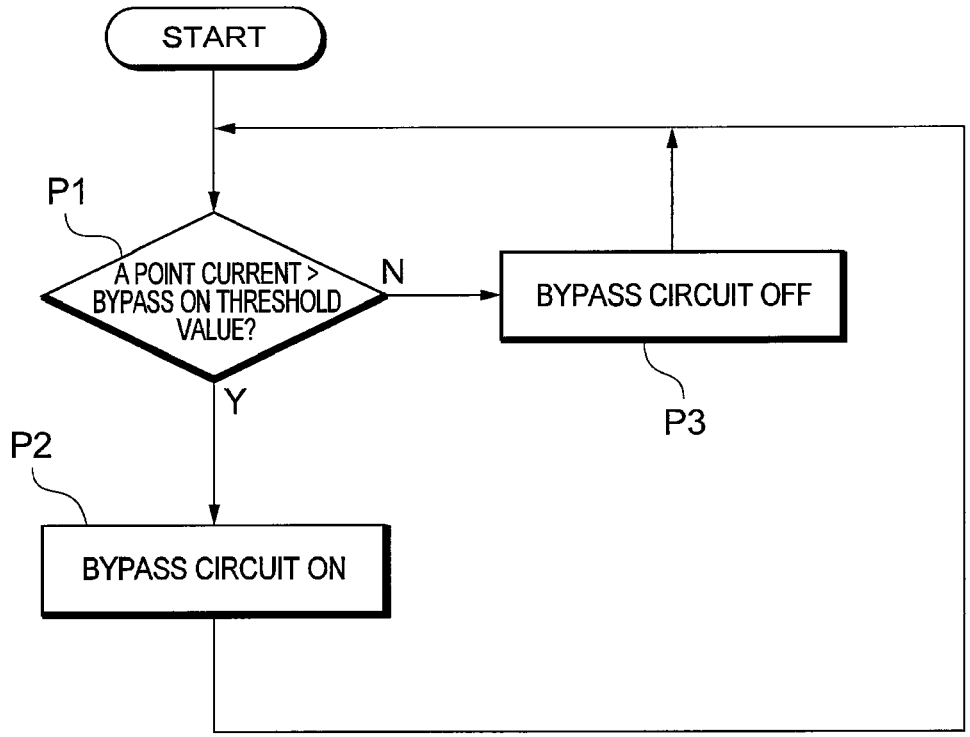
FIG. 11 is a flowchart which explains ON/OFF control of a bypass circuit of the FC voltage raising converter depicted in FIG. 2.

Therefore, for example, the ECU 20 judges whether or not the L1 current amount exceeds the bypass ON threshold value (processing P1) as depicted in, for example, FIG. 11, performs the ON-control of the bypass circuit 12*d* when the amount exceeds the value (processing P2 from a Y route of the processing P1), and performs the OFF-control of the bypass circuit 12*d* when the amount does not exceed the value (processing P3 from an N route of the processing P1).

[5] Modification Example

Figure 12:
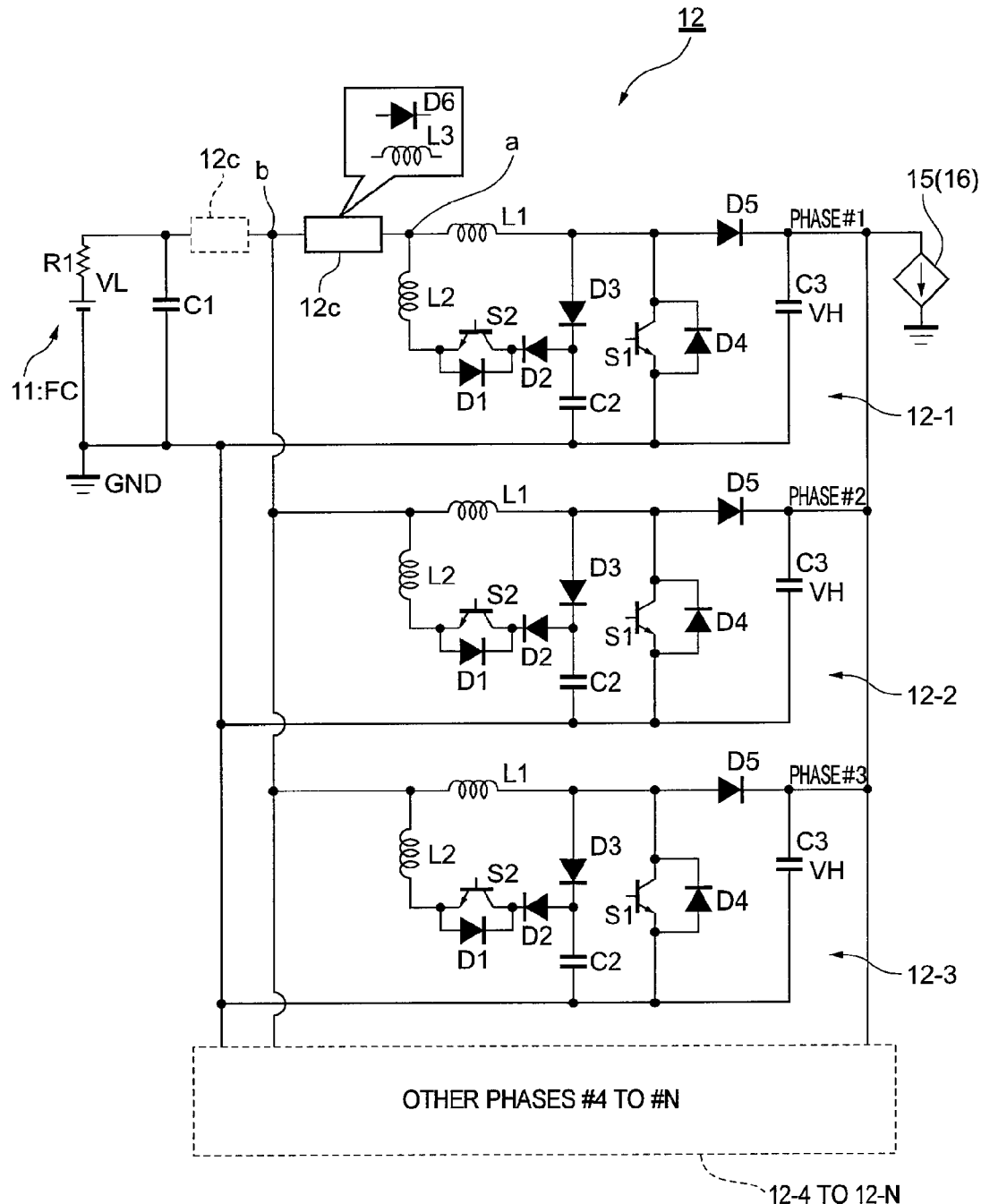
FIG. 12 is a circuit diagram illustrating an example of a multiple-phase converter as a modification example of the FC voltage raising converter depicted in FIG. 2.

FIG. 12 is a circuit diagram illustrating a modification example of the voltage raising converter 12 described above. A voltage raising converter 12 depicted in FIG. 12 is a multiple-phase converter corresponding to N phases (N is two or a larger integer), and N resonant converters 12-1 to 12-N corresponding to the respective phases are connected in parallel. Each resonant converter 12-*i* (i=any one of 1 to N) includes the main circuit 12*a* and the auxiliary circuit 12*b* depicted in FIG. 2. However, a capacitor C1 may be common to the respective phases.

Moreover, it is sufficient to provide a regenerative current blocking circuit 12*c* in the resonant converter 12-*i* corresponding to the phase #i in which a single phase driving period is specified in a case where the number of driving phases in accordance with a requested output voltage (the voltage to be raised) is controlled to increase or decrease in a range of 1 to N. This is because in a state (period) where a plurality of phases are simultaneously driven, the amount of the current to be supplied from the power source (the FC 11) is relatively larger than the amount of the resonance current in individual phases, and hence it can be considered that the resonance current does not flow backward to the FC 11 side.

In an example depicted in FIG. 12, the phase #1 is set as a phase in which the single phase driving may arise, and between a connection point a of a reactor L1 to a reactor L2 in the resonant converter 12-1 corresponding to the phase #1 and a parallel connection point b with another phase #j (j=any one of 1 to N, and j #i), the regenerative current blocking circuit 12*c* is provided. When the regenerative current blocking circuit 12*c* is provided at the position, a current exceeding the current for the single phase does not flow through the regenerative current blocking circuit 12*c* as compared with a case where the circuit is provided at a position (the position denoted with a dotted line frame 12*c*) which is common to the respective phases, and hence the capacity, size or insertion losses of an element (e.g. a diode D6 or a reactor L3) can be decreased to 1/N. Moreover, driving phase control described later can obviate the necessity of the bypass circuit 12*d* described above.

Figure 13:
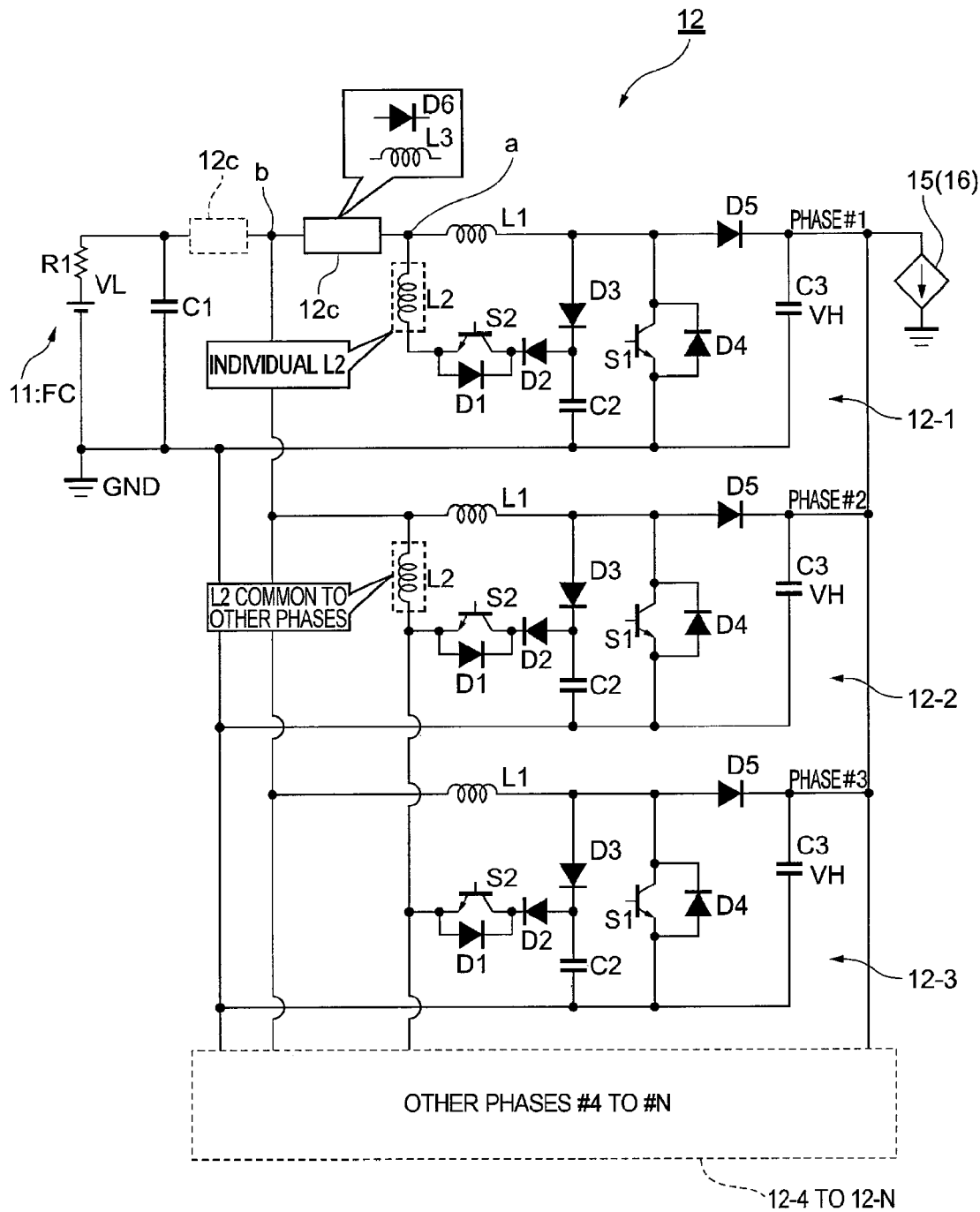
FIG. 13 is a circuit diagram illustrating an example of the multiple-phase converter as the modification example of the FC voltage raising converter depicted in FIG. 2.

It is to be noted that in a case of N≥3, reactors L2 in phases other than the phase in which the single phase driving period is specified may be a common reactor as depicted in, for example, FIG. 13.

(Control Logic of Each Phase)

In the case of the circuit depicted in FIG. 12 and FIG. 13, the regenerative current blocking circuit 12c is provided only in the phase #1 in which the single phase driving period is specified (the resonant converter 12-1), and hence for obtaining an effect which is equal to that in the case where the bypass circuit 12d is provided, the circuit is designed so that the L1 current exceeds the above-mentioned bypass ON threshold value in the single phase driving period as described above with reference to FIG. 8 through FIG. 10.

Figure 14:
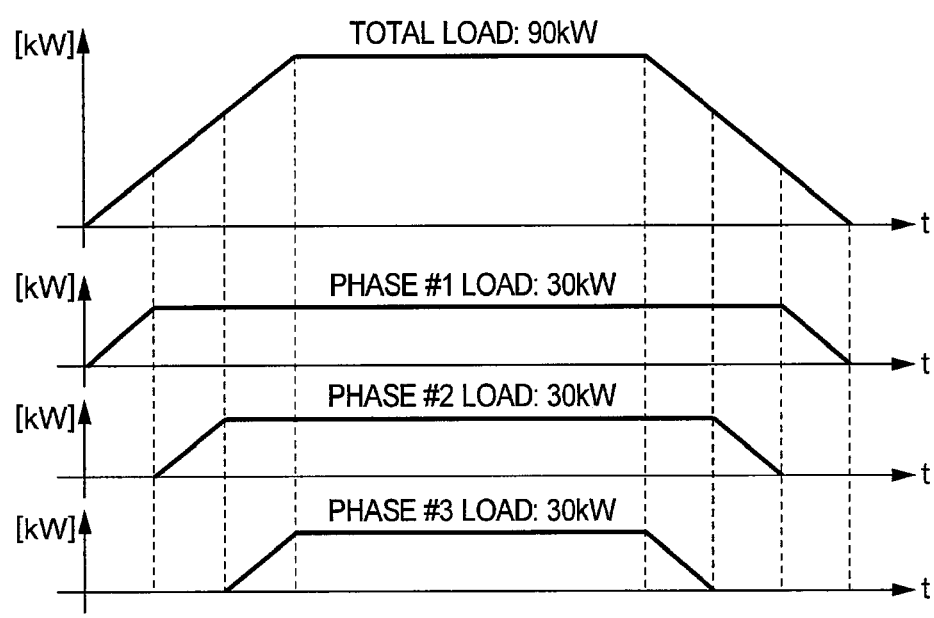
FIG. 14 is a diagram which explains an order control example of driving phases of the multiple-phase converter depicted in FIG. 12 and FIG. 13.

Moreover, as depicted in, for example, FIG. 14 (in the case of N=3), the driving is started from the phase (the phase #1) provided with the regenerative current blocking circuit 12c, and driving phases (the phase #2 and the phase #3) are increased in accordance with the increase of a load. Conversely, when the driving phases are decreased, the driving is stopped from phases (the phase #3 and the phase #2) other than the phase provided with the regenerative current blocking circuit 12c, and the driving is performed up to the end of the phase (the phase #1) provided with the regenerative current blocking circuit 12c. It is to be noted that a driving order of the phases other than the phase provided with the regenerative current blocking circuit 12c may appropriately be changed.

Figure 15A:
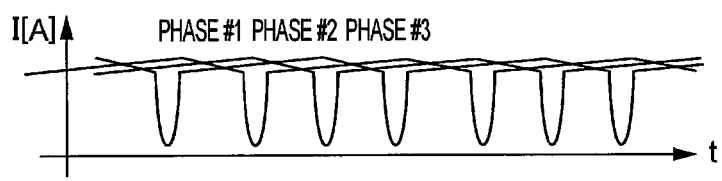
FIG. 15 is a diagram which explains an inter-phase timing control example of the multiple-phase converter depicted in FIG. 12 and FIG. 13, and (A) illustrates an example of a change of the resonance current with time and (B) illustrates an example of a change of a power source output current with time, respectively.
Figure 15B:
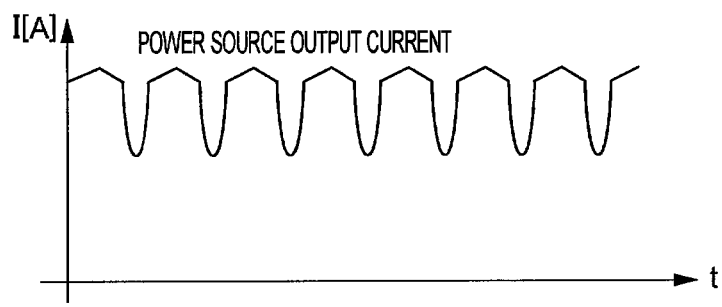

Moreover, when a plurality of phases are driven, a phase difference may be given to an ON timing of an auxiliary switch S2 of each phase. In consequence, a phase (a peak) of an L2C2 resonance current can be varied among the phases, as schematically depicted in, for example, FIG. 15(A). Therefore, it is possible to avoid the regeneration of the L2C2 resonance current at the same timing from each phase and the regeneration of a synthesized current which cannot be absorbed by a capacitor C1 on an FC 11 side. It is to be noted that FIG. 15(B) is a diagram schematically illustrating an example of a change of a power source (FC 11) output current with time.

The above-mentioned driving phase order control and inter-phase timing control can be performed by, for example, the ECU 20.

[6] Others

The above embodiment may be applied to a DC-DC converter (e.g. another type of converter such as a voltage lowering converter) including an electricity path through which a resonance current flows in an opposite direction from a main current of a power source side. Moreover, the above embodiment is not limited to the DC-DC converter installed on a car, and may be applied to DC-DC converters installed on electric devices such as a personal computer, an audio visual (AV) device and a portable terminal.

DESCRIPTION OF REFERENCE SYMBOLS 1 vehicle
2 driving wheel
10 power supply system (fuel cell system)
11 fuel cell (FC) (direct-current power source)
12 FC voltage raising converter
12a main circuit
12b auxiliary circuit
12c regenerative current blocking circuit
12d bypass circuit
13 battery
14 battery voltage raising converter
15 inverter
16 motor
20 electronic control unit (ECU)
21 accelerator pedal sensor
120 connection point
C1 input capacitor
C2 capacitor
C3 output capacitor
D1 to D6 diode
L1, L2 and L3 reactor (coil)
S1 main switch
S2 auxiliary switch

The invention claimed is:

1. A power supply system comprising a direct-current power source, and at least one resonant converter which converts a direct-current voltage input from the direct-current power source into a predetermined output voltage by soft switching based on a current resonance phenomenon,
    wherein the at least one resonant converter has a joining connection point where a resonance current joins a main current from the direct-current power source, wherein the resonance current is generated by the resonance phenomenon and flows in a direction opposite to the main current,
    wherein the at least one resonant converter is a plurality of resonant converters which are connected in parallel between the joining connection point and the direct-current power source, and
    in a predetermined resonant converter of the plurality of resonant converters single driving period is specified when the plurality of the resonant converters to be driven is controlled to increase or decrease in accordance with the predetermined output voltage, a current blocking circuit which blocks the resonance currents of the plurality of resonant converters toward the direct-current power source is provided between the joining connection point and a parallel connection point formed by the parallel connection.

2. The power supply system according to claim 1, wherein the current blocking circuit is a diode in which an anode is connected to an electricity path on a side of the direct-current power source and a cathode is connected to the electricity path on a side of the joining connection point.

3. The power supply system according to claim 2, further comprising: a bypass switch provided in the electricity path which bypasses the current blocking circuit,
    wherein the bypass switch is ON-controlled in a case where a current amount of the main current is not less than a predetermined value.

4. The power supply system according to claim 1, wherein the current blocking circuit is a reactor.

5. The power supply system according to claim 2, wherein phases of the resonance currents in the respective resonant converters of the plurality of resonant converters are controlled to become different from one another.

6. The power supply system according to claim 4, further comprising: a bypass switch provided in an electricity path which bypasses the current blocking circuit,
    wherein the bypass switch is ON-controlled in a case where a current amount of the main current is not less than a predetermined value.

7. The power supply system according to claim 6, wherein phases of the resonance currents in the respective resonant converters of the plurality of resonant converters are controlled to become different from one another.

8. The power supply system according to claim 1, further comprising: a bypass switch provided in an electricity path which bypasses the current blocking circuit, wherein the bypass switch is ON-controlled in a case where a current amount of the main current is not less than a predetermined value.

9. The power supply system according to claim 1, wherein phases of the resonance currents in the respective resonant converters of the plurality of resonant converters are controlled to become different from one another.

* * * * *

UNITED STATES PATENT AND TRADEMARK OFFICE
CERTIFICATE OF CORRECTION

PATENT NO. : 8,773,874 B2
APPLICATION NO. : 13/375699
DATED : July 8, 2014
INVENTOR(S) : Takahiko Hasegawa et al.

It is certified that error appears in the above-identified patent and that said Letters Patent is hereby corrected as shown below:

In the Specification

At column 11, line 66, remove indentation before "15 inverter".

At column 11, line 67, remove indentation before "16 motor".

In the Claims

At column 12, line 29, claim 1, change "converters single" to -- converters a single --.

Signed and Sealed this
Thirty-first Day of March, 2015

Michelle K. Lee
*Director of the United States Patent and Trademark Office*